…

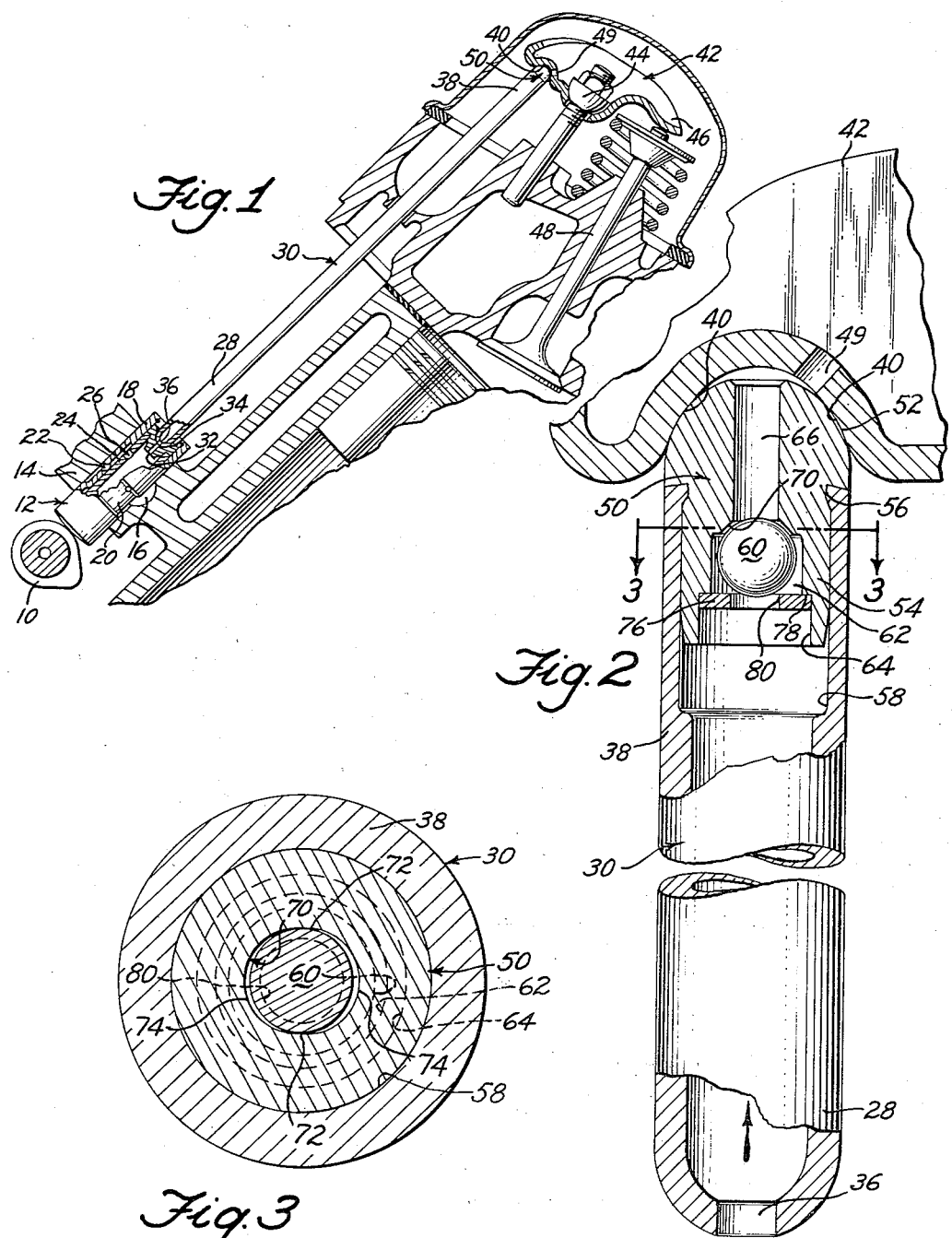

United States Patent Office 3,054,392
Patented Sept. 18, 1962

3,054,392
METERING VALVE
Earl A. Thompson, 1300 Hilton Road, Ferndale 20, Mich.
Filed Mar. 24, 1960, Ser. No. 17,343
3 Claims. (Cl. 123—90)

This invention relates to valves, and more particularly to valves for metering or restricting the flow of fluid.

While useable in many environments, the valve of this invention was developed primarily to solve a long-standing problem confronting the automotive industry, and will be disclosed in such a setting. In lubricating internal combustion engines—especially automotive engines of the overhead valve type—the problem of providing adequate lubricant at low r.p.m., while preventing over-oiling at high r.p.m., is a perplexing one. More specifically, the supplying of oil to the remote rocker arm assemblies by means of hollow push rods is currently not satisfactory.

The provision of a small orifice of predetermined cross section to meter the flow of oil where it is received from the tappet, and allow only this metered amount to be delivered through the push rod and to the rocker arm assembly, is not a satisfactory solution, for the hole or orifice has to be so small for low r.p.m. operation that it continually plugs up with tiny particles of foreign matter, and a fixed flow orifice does not supply enough oil at high r.p.m..

Inertia, flutter and other types of metering valves, incorporated usually in the hydraulic valve lifter, have been proposed; however, while they are suitable at low r.p.m. they do not successfully meter or restrain the flow of lubricant at high r.p.m. This is because they do not remain properly at rest on their metering seat at high r.p.m. but are continually jarred away from their seats by many various influences, such as the harmonics set up in the powerful valve closing spring. As a result, when the inertia valve leaves its metering seat, excess quantities of lubricant flow through the valve, through the hollow push rod, and flood the rocker arm assembly in a highly unsatisfactory manner.

Over-oiling such as this causes extremely unpleasant smoking of an engine. The inlet or intake valves create a vacuum on their opening stroke and draw some of this excess lubricant, which is running around the top of the cylinder head, into the cylinder itself, which causes exhaust smoking and spark plug fouling and is very undesirable. Furthermore, the excess agitation of the lubricating fluid causes aeration which results, for instance, in air bubbles eventually entering the chambers of the hydraulic valve lifters and rendering them inoperative. To combat the former problem, automotive manufacturers have provided rubber "boots" on the valve stems, metallic "hats" around the the valve closing spring, and have even gone to the extent of providing deep gulleys or channels in the head to quickly drain away the excess lubricant. But these expedients do not get at the source of the difficulty, and are expensive.

Accordingly, it is an object of the present invention to provide a metering valve which successfully meters or restrains the flow of fluid to correspond with varying operating speeds.

Another object of this invention is to provide a metering valve for the lubricating passages of an internal combustion engine which will govern the flow of lubricant under the most adverse jarring, vibratory circumstances.

A further object of this invention is to provide a metering valve of extremely simple construction which can be incorporated in a hollow push rod of the type currently in use without major redesign.

A still further object is to provide a combined metering and check valve in the output end of a push rod which will hold the push rod full of lubricant when the engine is not in use, so that an adequate supply of lubricant is immediately available when the engine is started.

Other objects and advantages of the present invention will be apparent from the following detailed description, with reference to the accompanying drawing in which like reference characters refer to the same parts throughout the several views, and in which:

FIGURE 1 is a fragmentary sectional view of an automotive internal combustion engine of the overhead valve type showing the valve train and the passages by which lubricant is conducted to the rocker arm assembly;

FIGURE 2 is an enlarged view in partial sectional elevation illustrating the combined metering and check valve of this invention installed in the output end of a hollow push rod engaging the socket seat of a conventional rocker arm; and FIGURE 3 is a sectional view taken along the lines 3—3 of FIGURE 2 on an even larger scale showing the configuration of the metering seat of the valve of this invention.

A conventional multiple unit linkage system such as a valve train of the overhead valve type of automotive internal combustion engine shown in FIGURE 1 derives its motions from a rotary cam 10. Following the contours of the cam 10 is a standard hydraulic valve lifter 12 reciprocable in the engine block 14 through which an oil gallery 16 extends. Gallery 16 is connected with a suitable engine driven lubricant pump, not shown, and thus constitutes a typical source of fluid under variable, super-atmospheric pressure.

The outer cylindrical casing 18 of the hydraulic valve lifter picks up fluid from the passage 16 by means of an annular outer groove 20 and suitable holes 22 located therearound. The fluid enters the inner sliding member 24 of the tappet through other holes 26, and is allowed to enter the inner or input end 28 of the hollow push rod 30 by means of another hole 32 in the push rod seat 34 aligned with a hole 36 in the input end of the push rod.

Thus lubricant from gallery 16 is forced outwardly through the hollow push rod 30 toward the output end or outer working extremity 38 thereof. The output extremity 38 of the push rod abuts the spherical or socket seat 40 of a conventional rocker arm 42 which is fulcrumed on an inverted semi-spherical pivot 44 and which, at its other end 46, engages the stem 48 of a conventional spring loaded or otherwise counter-biased valve. The push rod seat 40 of the rocker arm 42 conventionally contains a hole 49 in the recessed portion of the spherical socket, out of direct alignment with the axis of the push rod, through which lubricant may pass to reach the parts of the rocker arm assembly which need lubricating.

Within the output end or extremity 38 of the hollow push rod 30 is the combined metering and check valve 50 of this invention. It consists of a body of relatively hard material with a spherical surface 52 finished thereon to engage the spherical portion 40 of the socket seat of the rocker arm 42. Inwardly of the rounded end 52 is a cylindrical housing portion 54 of a diameter less than the outer diameter of the push rod 30. A cannelure or annular groove 56 is provided into which the metal of the push rod, after its internal diameter has been increased somewhat as at 58, may be rolled or otherwise pressed to secure the valve body unit 50 permanently to the push rod 30.

Within the valve unit 50, a ball or other generally spherical closure member 60 is loosely retained in a cylindrical valve chamber 62 formed in the cylindrical housing portion 54. The constant clearance between the ball and the cavity wall is sufficient to allow more flow than can enter or leave the chamber through either of the partially obstructed end openings as can be seen from the drawings. The ball cavity or chamber 62 communicates with the lubricant passages by means of an enlarged cylindrical entrance or inlet 64, and a smaller bore or outlet 66 which extends through the unit and out the rounded end near the opening 49 in the rocker arm 42.

The spherical valve member 60 is prevented from escaping from its chamber 62 through the exit 66 by means of a shoulder or metering seat 70 which joins the chamber 62 with the outlet 66. The metering seat 70 is shaped (FIGURE 3) to more closely resemble an ovoid than a circle. In actual practice, the preferred embodiment of this invention utilizes a metering seat which is in effect a very short bevelled longitudinal slot having parallel straight edges 72 connected by rounded ends 74; however, the straight or stopping portions 72 of the metering seat's over-all configuration are so short in comparison to the semi-circular fluid metering ends 74 that the total effect is that of a chamfered ovoid. The seat is formed in any suitable manner, for instance by means of a coining operation, in the material of the body before it is hardened. Due to the oval configuration, the ball does not fit the seat in a manner to form a seal, and a predetermined quantity of lubricant will leak around the ball and through the rounded ends 74 of the seat for low r.p.m. oiling. Since any non-circular seat that the ball would not entirely close would meter the flow of fluid, the ovoid configuration of the metering seat of this invention which has proved satisfactory in actual operation should be taken as an exemplary—not exclusive—configuration.

The inlet 64 to the ball chamber 62 of the valve 50 is partially obstructed by a washer-shaped plug 76 which may be inserted within the inlet 64 in a slightly dished fashion—after the manner of a Welsh plug—until it abuts the shoulder 78, and then punched flat until its outer diameter snugly engages the walls of the inlet 64 to obtain a permanent press fit. A circular check seat 80 is provided in the plug 76 in direct alignment with and opposed to the metering seat 70. The check seat 80 is a cylindrical hole in the plug 76 adapted to be completely closed by the spherical valve member 60. Since the plug 76 is made of a somewhat softer material than the rest of the valve assembly, the effectiveness of the close fit between the ball 60 and the circular check seat 80 will increase through usage and wear. The washer plug 76 containing the check seat 80 prevents the ball 60 from escaping through the inlet 64, and particularly limits the longitudinal size of the chamber 62 in a precise manner such that as the ball leaves the check seat 80 (permitting flow therethrough) it immediately begins to close the metering seat 70 (limiting flow); conversely, as the ball 60 moves away from the metering seat 70 it immediately begins to close the check seat 80.

In operation, the valve in the output end of the push rod, which consists basically of a ball movable alternately between an oval metering seat and a circular check seat opposed to and in alignment with each other, acts to permit only the proper quantities of lubricant to escape through the end of the push rod and into the rocker arm assembly. When the engine is shut off, the vacuum created by the weight of the oil in the push rod tending to drain back to the engine block will pull the ball 60 into tight fitting engagement with the check seat 80 and block all flow in either direction through the push rod, and maintain the rod essentially full of lubricant; then, when the engine is again started, the rod will be primed with lubricant and oiling of the rocker arm assembly will commence immediately.

As oil from gallery 16 is forced during engine operation outwardly through the push rod, it will enter the chamber 62 through the inlet 64 and the check seat 80 and force the ball 60 against the metering seat 70 at low operating speeds. The oval ends 74 of the metering seat will allow a predetermined flow of lubricant around the ball and through the outlet 66 and, by means of the opening 49, onto the rocker arm assembly. Harmonics set up in the main valve spring, and other vibratory influences at high r.p.m. may tend to jar or shake the ball 60 away from the metering seat 70. However when this occurs, oil will not rush through the valve 50 and over-oil the rocker arm assembly because, as the ball leaves the metering seat 70, it will immediately start to close the check seat 80 and excess flow will be stopped. As the ball 60 is bounced off the check seat 80, and before excessive flow begins, the ball will seat on the metering seat to successfully restrain the flow of lubricant that reaches the rocker arm assembly yet will allow greater flow than when the ball is held against the metering seat. Thus, by locating the check seat 80 in alignment with and relatively near the metering seat 70, over-oiling is successfully corrected and lubricant flow corresponds to the operating speed.

Jarring or other movement of the ball 60, which is free also to roll on the straight portions 72 of the metering seat, will dislodge and disperse any particles of foreign matter which might tend to influence effective operation of the metering valve.

While the above described embodiment constitutes a preferred mode of carrying out this invention, many other forms might be adopted within the scope of the actual invention, which is variously claimed as:

1. In a multiple unit mechanical linkage system connected to transfer to-and-fro motion at varying operating speeds between a rotary cam and a spring-loaded valve in an internal combustion engine wherein one of the units is an oscillating rocker arm, means for controlling the flow of lubricant from a variably pressurized source through the linkage system to the rocker arm comprising in combination passage means in the units located between the source and the rocker arm connected to conduct lubricant therethrough, the passage means in one of the units including a walled chamber having a check seat opening in one wall through which lubricant may flow in freely from the source and a metering seat opening in another wall through which lubricant may flow out freely toward the rocker arm, a loose valve member trapped in the chamber and having a convex portion adapted to enter and obstruct the check seat opening when in seating contact therewith to prevent lubricant flow and a convex portion adapted to enter yet only partially obstruct the metering seat opening when forced in seating contact therewith by the pressurized source at low operating speeds to permit a small predetermined amount of lubricant flow, the valve member having a clearance with the chamber walls sufficient to allow lubricant flow therethrough at a rate greater than the small predetermined amount of metering flow, and the two openings being closely spaced relative to the valve member so that unobstructed flow through one diminishes immediately as the valve member begins to leave and open the other whereby increasing vibratory influences on the linkage system as the operating speed increases tend to overcome the pressurized source and shift the valve member out of the openings with a greater frequency allowing lubricant flow to increase with operating speed to a point approaching the greater flow rate allowed by the clearance between the valve member and the chamber walls thereby controlling lubricant flow from the source to the rocker arm to correspond to varying operating speeds of the linkage system.

2. In a multiple unit mechanical linkage system connected to transfer to-and-fro motion at varying operating speeds between a rotary cam and a spring-loaded valve in an internal combustion engine wherein one of the units is an oscillating rocker arm, means for controlling the flow of lubricant from a variably pressurized source through the linkage system to the rocker arm comprising in combination passage means in the units located between the source and the rocker arm connected to conduct lubricant therethrough, the passage means in one of the units including composite valve means for preventing both back flow when the source is not pressurized and excessive flow when the operating speed increases as well as for variably metering flow of lubricant to correspond with varying operating speeds of the linkage system, the valve means including plural variable flow openings for lubricant and a randomly oscillatable spherical member for controlling their effective sizes in response to vibratory motion of the one unit whereby the flow rate of lubricant may be regulated by the operating speed of the linkage system.

3. In a multiple unit mechanical linkage system connected to transfer to-and-fro motion at varying operating speeds between a rotary cam and a spring-loaded valve in an internal combustion engine wherein one of the units is an oscillating rocker arm, means for controlling the flow of lubricant from a variably pressurized source through the linkage system to the rocker arm comprising in combination passage means in the units located between the source and the rocker arm connected to conduct lubricant therethrough, the passage means in one of the units including a cylindrical walled chamber having at one end a circular check seat through which lubricant may flow in freely from the source and at the other end a metering seat taking the form of a bevelled ovoid through which lubricant may flow out freely toward the rocker arm, a spherical valve member trapped in the chamber for limited movement therein and having a predetermined clearance with the chamber walls, the two seats being axially aligned with one another and spaced in opposition to prevent the spherical valve member from ever completely opening either seat, the maximum flow allowed through either seat being less than that allowed by the clearance between the spherical valve member and the chamber walls thereby controlling lubricant flow from the source to the rocker arm to correspond to varying operating speeds of the linkage system.

References Cited in the file of this patent
UNITED STATES PATENTS

| | | |
|---|---|---|
| 2,818,050 | Papenguth | Dec. 31, 1957 |
| 2,840,063 | Purchas | June 24, 1958 |
| 2,845,914 | Cobo | Aug. 5, 1958 |
| 2,857,895 | Scheibe | Oct. 28, 1958 |
| 2,954,015 | Line | Sept. 27, 1960 |